3,814,713
ADHESIVE COMPOSITION

Toshio Honda and Eishi Kubota, Tokyo, Shoji Tanaka, Tokorozawa, and Yukio Fukuura, Tokyo, Japan, assignors to Bridgestone Tire Company Limited, Tokyo, Japan
No Drawing. Filed Dec. 3, 1971, Ser. No. 204,703
Claims priority, application Japan, Dec. 4, 1970, 45/106,765; Dec. 15, 1970, 45/111,119
Int. Cl. C08d 7/04; C08g 5/10, 37/18
U.S. Cl. 260—29.3                                    6 Claims

ABSTRACT OF THE DISCLOSURE

New adhesive composition for bonding rubber material to any of various materials inclusive synthetic and natural polymers, metals and even silicate and ceramic materials with only a single application. It comprises essentially a rubber latex, a high molecular weight resorcin-formaldehyde resin and a low molecular weight resorcin-formaldehyde resin. The third component contains unreacted resorcin less than 15 weight percent, and preferably less than 10 weight percent and more preferably less than 5 weight percent. For the purpose of adjusting the amount of unreacted resorcin, the low molecular weight resorcin-formaldehyde resin is dissolved in a monoketone of

in which $R_1$ means an aliphatic hydrocarbon radical and $R_2$ means an aliphatic or aromatic hydrocarbon radical, from which unreacted resorcin is removed by and by according to repeated water extractions.

---

The invention relates to a new adhesive composition, and more particularly to such composition for bonding rubber material to any of other various materials to form a rubber article.

There are various rubber articles to be formed by combining and bonding together a rubber element with another element of another material, such as tires for motor vehicles and bicycles, belts for conveyors and pulleys, hoses, vibration isolators, shock absorbers, various housing materials, electric equipment, electric wires and cables, each of which has a rubber element to be bonded with a plastic, synthetic fiber, metallic or non-metallic inorganic material. In order to bond them to each other, naturally a particularly strong adhesive is required.

In some rubber articles such as tires, belts, etc., the rubber element is reinforced or backed by a fabric or cord of regenerated cellulose, polyester, polyamide, polyvinyl alcohol or similar synthetic fibers. These articles are often subjected to cyclical or repeated large stress or deformation so that adhesion between the rubber and fabric portions must sufficiently withstand it. For that purpose a liquid adhesive called RFL has been proposed and used, which is a mixture of a rubber latex and an aqueous solution of the primary polycondensation product of resorcin with formaldehyde. As the latex, styrene-butadiene copolymer or vinylpyridine-styrene butadiene copolymer is often used. As a catalyst for the polycondensation of resorcin with formaldehyde, a basic substance such as sodium, potassium or ammonium hydroxide is preferably used. Full information as to this RFL adhesive can be found on page 847, M. I. Dietrik, "Rubber World," Vol. 136, No. 6 (1957) and page 4, D. Boguslavski et al., "Soviet Rubber Technology," No. 1 (1959) published by The Research Association of British Rubber Manufacturers. It has been admitted, however, that treating the fabric or cord merely with such RFL adhesive liquid is not always satisfactory for that purpose.

So far as the polyester cord to be bonded with the rubber element is concerned, particular proposals have been made. British Pat. No. 816,640 discloses a process comprising steps of applying a solution of polyisocyanate in an organic solvent to the polyester cord to be dried and further applying RFL to be dried. Japanese Patent Application published under the number 10,514/1964 discloses a process comprising steps of treating the polyester fabric with an epoxy compound solution to be dried and further with RFL to be dried. They are still unsatisfactory, however, because of the necessity of using an organic solvent which is inflammable and toxic and of the double application as well as drying steps. The two-step treatment would be fatally disadvantageous in view of the productivity in these rubber article industries.

In order to bond a rubber element to the metallic element, it has been proposed to subject the previously copper or copper alloy plated metallic material to which the rubber material is attached to a vulcanization bonding treatment. This vulcanization-bonding method is, however, not satisfactory due to the fact that it requires considerable expense for material, apparatus and the like necessary for the plating, that the copper alloy composition and the rubber composition must be particularly selected and that the adhesion force is lowered when moisture in the ambient atmosphere is absorbed.

Another method for bonding a metallic material to rubber has been proposed according to which chlorinated rubber, cyclized rubber, a synthetic resin such as epoxy resin, a polyisocyanate or the like is coated on the surface of the metallic material on which the rubber member is attached and then vulcanizingly bonded. It is necessary in general for applying such an adhesive to previously dissolve the same in an organic solvent. Thus when the bonding work is done on a larger scale, the inflammability and toxicity of the organic solvent is to be the problem. Many of said materials, above all the epoxy resin and the polyisocyanate are of short storage life, which makes this method unsatisfactory. The most important defect for adopting the method on an industrially larger scale would be the necessity of double applications. For instance when using chlorinated rubber, it is usually necessary to coat the metallic material with the solution of chlorinated rubber rich in chlorine content to be dried, and then further apply an adhesive having relatively less chlorine content to be dried so as to be subjected together with the rubber member to the vulcanization bonding.

An object of the invention is thus to provide an adhesive composition capable of causing sufficiently strong adhesive with only single application.

Another object of the invention is to provide an adhesive composition having no inflammability nor toxicity and which can be stored effectively for an extended period of time.

Still another object is to provide an adhesive capable of bonding the rubber material with silicate and ceramic materials which has been considered impossible.

Other objects as well as various advantages of the invention will be appreciated from the explanation which follows.

The adhesive according to the invention comprises a polycondensation product of resorcin with formaldehyde as prepared by reacting in the ratio of 0.8 or less mole formaldehyde relative to 1 mole resorcin and adjusting the amount of unreacted resorcin to less than 15 weight percent, a relatively high average molecular weight of polycondensation product as prepared in the ratio of 0.8 to 7.5 mole formaldehyde relative to 1 mole resorcin, and a rubber latex. Among said three components the first one, i.e. the relatively low molecular weight resorcin-formaldehyde polycondensation product is very important and must be prepared carefully according to a particular process.

Another object of the invention is thus to provide a particular process for manufacturing the low molecular weight resorcin-formaldehyde polycondensation product.

According to the adhesive composition of the invention, the rubber material can be bonded with various materials. They are organic materials such as polyamide, polyester, various celluloses, polyvinyl alcohol, wood and the like; inorganic materials such as metals, silicate and ceramic wares and the like. These materials to be bonded to the rubber may take various forms necessary for preparing the rubber articles to be used in the industries and daily living, such as wire, filament, ribbon, string, cord, bar, foil, plate, powder, particles, granules, ball, mass and so on. They may be porous.

The metallic material referred to herein is any of metals other than alkali metal elements such as sodium, potassium, lithium etc. so that they include iron, nickel, cobalt, aluminum, chromium, manganese, niobium, tantalum, titanium and alloys thereof, and above all industrially useful alloys of iron and aluminum such as stainless steel and duralumin.

The silicate and ceramic materials as referred to above include glasses, porcelain enamels, cement and similar settable materials such as limes, dolomite plaster, gypsums, magnesia cement, pozzolanic cement, natural cement, portland cement, mixed cement, alumina cement, porcelains and earthenwares, semivitreous earthenware, tiles, bricks, alumina porcelain, cordierite porcelain, depidolite porcelain, ferrite porcelain, cermet and so on. Attention is called to the fact that there has been provided no effective adhesive capable of bonding the rubber material with any of such silicate and ceramic materials. According to the adhesive composition of the invention, it is possible to provide strong adhesion between the rubber material and any of such particular materials with only a single application thereof.

The rubber referred to in the specification involves every natural and synthetic rubber, which is generally called elastomeric polymer, above all natural rubber, styrene-butadiene copolymer rubber, butadiene-acrylonitrile copolymer rubber, polybutadiene rubber, polyisoprene rubber, isoprene-isobutylene copolymer rubber, polychloroprene rubber and blends of two or more thereof.

There is no particular art required for attaining desirable adhesion. The adhesive of the invention is coated on the material to which the rubber member is to be bonded. After drying to form a uniform film of the adhesive thereon, the member of unvulcanized rubber is fixed thereto and heated with pressure to bring about the necessary vulcanization according to the usual method. That is all that is required for attaining sufficiently strong adhesion.

The adhesive composition according to the invention comprises essentially a relatively low molecular weight resorcin-formaldehyde resin which shall be referred to hereinafter as low molecular weight RF resin, a relatively high molecular weight resorcin-formaldehyde resin which shall be referred to hereinafter as high molecular weight RF resin, and a rubber latex.

The high molecular weight RF resin can be easily obtained by reacting resorcin with formaldehyde at a mole ratio of 1 to 0.8–7.5 in the presence of an alkaline catalyst, for instance a hydroxide of an alkali metal such as caustic soda and caustic potash, a secondary or tertiary organic amine, or ammonium hydroxide, at room temperature or a little above.

At the latex, styrene-vinylpyridine-butadiene copolymer rubber, styrene-butadiene copolymer rubber, natural rubber, acrylonitrile-butadiene copolymer rubber, polychloroprene rubber, chloroprene-acrylic acid copolymer rubber and the like can be used. For all-purpose rubbers such as natural rubber, styrene-butadiene rubber, polybutadiene rubber, polyisoprene rubber etc. either one of said latexes or mixture of the two or more may be used. In general, however, the latex is preferably selected depending on the rubber to be bonded. When for instance acrylonitrile-butadiene polymer rubber is bonded, the latex of said rubber is used.

The low molecular weight RF resin is the most important constituent of the adhesive composition according to the invention as referred to above. It is obtained by reacting resorcin with formaldehyde in the mole ratio of 1 to 0.05–0.8, and more preferably 1 to 0.3–0.6, preferably in water and without the catalyst or in the presence of a very small amount of an acidic catalyst.

As a result of studies made by the inventors, it has been confirmed that the low molecular weight RF resin contains unreacted resorcin, methylolated resorcin, dimer, trimer, tetramer and further higher polymers of resorcin so that there is a range of molecular weight distribution, among which the dimer, trimer, tetramer and methylolated resorcin are effective for adhesion but polymers higher than the pentamer inclusive will not contribute to the adhesive ability so much. The question is the presence of unreacted resorcin which is not only completely ineffective but also toxic. It has been observed that unreacted resorcin sublimes during drying the coated adhesive. Resorcin vapor is inflammable and the economical loss itself should not be ignored. Since it requires about 14 Kcal. heat per 1 mole of resorcin when vaporizing, the thermal effect would be bad when drying an adhesive containing such unreacted resorcin which is also a question to be taken into consideration. Unreacted resorcin in the low molecular weight RF resin can be easily observed and calculated according to various chromatographic analysis.

In order to synthesize the low molecular weight RF resin involving very little or no amount of resorcin polymers higher than the pentamer inclusive, it is necessary to react resorcin with formaldehyde while limiting the amount of the latter to less than equimole of the former. In order to form methylolated resorcin, dimer, trimer and tetramer thereof as much as possible for the purpose of strengthening the adhesive ability, however, formaldehyde is to be added in a lesser amount, which naturally causes an increase in the amount of unreacted resorcin. According to the analysis made by the inventors, when reacting in the ratio of 0.6 mole formaldehyde to 1 mole resorcin, 33% by weight of unreacted resorcin was found. In case of the reaction in the ratio of 0.8 mole formaldehyde to 1 mole resorcin, about 26 weight percent unreacted resorcin was found.

As a result of various experiments made by the inventors, it has been found that if the amount of unreacted resorcin in the low molecular weight RF resin is restricted to less than 15%, preferably less than 10% and more preferably less than 5%, so that vaporization of the resorcin during drying the coated adhesive will be substantially harmless to the human body and that the less the amount of unreacted resorcin the stronger is the adhesion.

The invention intends to provide a process for preparing the low molecular weight RF resin involving less than 15 weight percent unreacted resorcin in one aspect thereof as referred to above. It might be considered to subject the reaction product to sublimation to remove the unreacted resorcin content. The resorcin-formaldehyde resin is, however, of a structure having a methylene- or dimethylene ether-group bonding the resorcin nuclei so that the low molecular weight RF resin is of a character very similar to the resorcin monomer. It is thus difficult to separate unreacted rescorcin only. Due to the fact that the vapor pressure of resorcin is low, it is necessary to heat at a high temperature in order to effect sublimation of unreacted resorcin to be removed by utilization of differential vapor pressure, which will cause the oxidation of the resin as a side reaction. This is not desirable of course for adhesiveness.

According to the invention resorcin is reacted with formaldehyde in the mole ratio of 1 to 0.05–0.8, preferably in water as the reaction solvent and without any catalyst or in the presence of an acidic catalyst such as p-toluenesulfonic acid. After completion of the reaction, the reaction product is dissolved in a ketone to be referred to hereinafter. The extract is repeatedly washed with water or extracted therewith so that unreacted resorcin is selectively transferred to the water phase. Thus the low molecular weight RF resin can be obtained having unreacted resorcin in an amount decreased down to a predetermined ratio. Ketones suitable for that purpose are represented by the formula,

in which $R_1$ means an aliphatic hydrocarbon having 1 to 4 carbon radical atoms and $R_2$ means an aliphatic or aromatic hydrocarbon radical having 2 to 6 carbon atoms, each of which is liquid at a temperature of 20° C. Among them are included methyl ethyl ketone, methyl isobutyl ketone, methyl-n-butyl ketone, methyl isopropyl ketone, methyl-n-propyl ketone, methyl-n-amyl ketone, methyl isoamyl ketone, methyl-n-hexyl ketone, diethyl ketone, ethyl-n-propyl ketone, ethyl isopropyl ketone, ethyl-n-butyl ketone, ethyl isobutyl ketone, ethyl amyl ketone, ethyl hexyl ketone, di-n-propyl ketone, diisopropyl ketone, propyl-n-butyl ketone, propyl isobutyl ketone, propyl-amyl ketone, propyl hexyl ketone, di-n-butyl ketone, diisobutyl ketone, butyl amyl ketone, butyl hexyl ketone, 2,6,8-trimethylnonanone-4, acetophenone, methyloxide, phorone. Above all methyl isobutyl ketone and diisobutyl ketone are preferably used. Any of such ketones is used in the amount of 4 to 6 times the low molecular weight RF resin. The washing or extracting treatment with water is repeatedly carried out until the unreacted resorcin content is decreased down to the predetermined level in the resin, which can be observed according to the usual analysis method such as various chromatographies. Said treatment with water can be carried out at a temperature of 15 to 30° C. in the usual extraction apparatus of batch or continuous type.

The proportion of amounts of the three components, high molecular weight RF resin, low molecular weight RF resin and rubber latex is as follows. The high molecular weight RF resin is added preferably in the amount of 1 to 20 weight percent relative to the total solids content. Addition in the amount either more or less than said upper or lower limit would adversely affect the adhesiveness. More preferably it ranges from 5 to 15 weight percent. The liquid low molecular weight RF resin from which unreacted resorcin has been removed as referred to above is added in the amount preferably ranging from 25 to 75 weight percent relative to the total solids content, and ranges more preferably from 30 to 60 weight percent. The amount more or less than said range of the low molecular weight RF resin would lower the adhesive strength. The remainder of the solids content comprises the rubber latex. The concentration of the total solids content would be 1 to 30%, and more preferably 10 to 25%.

In addition to said three components essential for the adhesive composition according to the invention, any other material may be added as long as the addition will not adversely affect the adhesion. It is convenient to prepare the high molecular weight RF resin in the presence of the rubber latex. When the low molecular weight RF resin from which unreacted resorcin has been removed is added to said mixture of the high molecular weight RF resin and the rubber latex, the liquid adhesive composition of the invention can be finally prepared.

The temperature for drying the applied adhesive of the invention preferably ranges from 100° to 300° C. Naturally the higher the temperature, the less the time necessary for drying. Depending on the character of the material of the element to which the rubber element is to be bonded, the most economical temperature should be selected. For instance 1 to 10 minutes is suitable for iron, aluminum, polyester etc. at a temperature of about 240° C.

The invention shall be explained in more detail and definitiveness not for limiting it thereto but merely for explanation.

EXAMPLE 1

A low molecular weight RF resin to be used for the adhesive composition according to the invention was prepared as follows. Resorcin, 220 gr. (2.0 mole), was dissolved in 200 gr. water, to which were added 81 gr. of 37.0% formalin (about 1.0 mole as formaldehyde) and 0.3 gr. p-toluenesulfonic acid and reacted at room temperature (25° C.) for two days. As a result of analysis there was detected no unreacted formaldehyde but there was found unreacted resorcin in the amount of 35 weight percent relative to the total solids content.

To the liquid resin was added 1,500 gr. methyl isobutyl ketone so as to transfer all the reacted content and most of the unreacted resorcin content to the methyl isobutyl ketone phase and leave a small amount of unreacted resorcin in the water phase. After separating the water phase at the bottom, said organic phase was placed in a continuous extracting apparatus to proceed with extraction of unreacted resorcin by means of water so as to eventually transfer the small amount of unreacted resorcin into the water phase. According to the extraction with flowing water a 10 cc. per minute for 4 days, the amount of unreacted resorcin was decreased down to 1.9% in the resin.

EXAMPLE 2

The liquid mixture of the high molecular weight RF resin and the rubber latex was prepared in a concentration of 15% according to the following formula to be aged for 48 hours.

|   | Weight parts |
| --- | --- |
| Resorcin | 11.0 |
| 37% formaldehyde | 16.2 |
| 28% ammonium hydroxide | 10.0 |
| Gentack latex* | 244.0 |
| Water | 519.0 |

*The latex of vinylpyridine-styrene-butadiene copolymer rubber manufactured and marketed by General Tire & Rubber Company in U.S.A. (41% concentration).

To an aqueous solution of 10 weight parts of 28% ammonium hydroxide in 75 weight parts water, was added the low molecular weight RF resin as prepared according to Example 1 in the amount of 15 weight parts to prepare 100 weight parts liquid mixture, to which was added 100 weight parts of the liquid mixture of the rubber latex and the high molecular weight RF resin referred to above, to prepare the adhesive composition. Polyethylene terephthalate tire cord of twist structure 1,110 D/3, upper twist number 43 times/10 cm., lower twist number 43 times/10 cm. was dipped in said liquid adhesive composition and subjected to drying in air at a temperature of 235° C. for 2 minutes. The treated cord was found to be impregnated with the adhesive composition in the amount of 6.0 weight parts per 100 weight parts fibers.

The treated cord was embedded in a combined rubber composition sheet not yet vulcanized near the surface thereof and then vulcanized for 20 minutes at a temperature of 150° C. and under a pressure of 80 kg./cm.². The cord was bared out of the vulcanized rubber and peeled off therefrom at the rate of 30 cm. per minute for determining the delamination resistance. This can be considered and called the adhesive force which was 1.9 kg. per one cord.

The combined rubber used was of the following composition.

| | Weight parts |
|---|---|
| Natural rubber | 80 |
| Styrene-butadiene copolymer rubber | 20 |
| Carbon black | 40 |
| Stearic acid | 2 |
| Petroleum softener | 10 |
| Pine tar | 4 |
| Zinc white | 5 |
| Styrenated phenol (Antioxidant) | 1.5 |
| 2-benzothiazolylsulfide | 0.75 |
| Diphenylguanidine | 0.75 |
| Sulfur | 2.5 |

REFERENCE EXAMPLE 1

As a result of the same experiment as in Example 1 but using a low molecular weight RF resin from which no unreacted resorcin was removed, the delamination resistance or adhesion force was 1.4 kg. per one cord. When determining the decreased amount of the adhesive composition after 5 minutes at a temperature of 240° C. by means of a thermobalance it was found to be 10 weight percent caused by sublimation of unreacted resorcin.

REFERENCE EXAMPLE 2

A liquid composition comprising the high molecular weight RF resin and the rubber latex as in Example 1 but no low molecular weight RF resin was used for treating similar polyethyleneterephthalate cord. Similarly the adhesion force was determined to be only 0.5 kg. per one cord.

EXAMPLE 3

Various cords to be referred to hereinafter were treated respectively with the adhesive composition as used in Example 2 to show the following satisfactory results. Drying condition was 160° C. for 2 minutes.

| Tire Cords: | Adhesion force, kg. |
|---|---|
| Nylon 6 840 D/2 | 1.8 |
| Rayon 1,100 D/2 | 1.8 |
| Vinylon 1,100 D/2 | 1.7 |

EXAMPLE 4

The adhesive force of the adhesive composition as prepared in Example 2 was determined with respect to rubber bonded to the following metals according to the method as referred to in JISK–6301-8.2, in which on both circular faces of a disk or short cylinder of 3.2±0.2 mm. height and 40.56 mm. diameter are bonded two metal plates of thickness more than 9.53 mm. to be delaminated. The faces of the rubber disk were finished completely smooth, on which the adhesive composition of the invention as referred to above was applied by means of a brush. The excess liquid was wiped out so as to dry the piece in a hot air circulation dryer at 245° C. for 10 minutes. The composition of the rubber piece was the same as that given in Example 2. The results were very satisfactory as shown below.

| Metal: | JIS–6301 test, kg./cm.² |
|---|---|
| Iron | 70 |
| Iron plated with aluminum | 72 |
| Stainless steel | 70 |

EXAMPLE 5

From a transparent sheet of window glass there was taken a piece of 25 mm. x 150 mm. x 3 mm., whose smooth surface was dried by washing with acetone. The glass piece was dipped in the liquid adhesive composition and taken out for ranging in the atmosphere at room temperature. The excess liquid was removed by gravity so as to obtain the glass piece coated with a very thin film of the adhesive composition.

The treated test piece was dried further in a hot air circulation dryer at 245° C. for 10 minutes, and was then pressed onto a 3 mm. thick piece of the unvulcanized rubber mass as used in Example 2. This assembly was subjected to vulcanization at 155° C. for 30 minutes.

The rubber and the glass web was so strongly bonded that it was impossible by any means to separate them manually.

EXAMPLE 6

A similar test was carried out with respect to a tile piece of ceramic material to show similarly satisfactory bonding so that the title could not be manually separated from the rubber by any means.

EXAMPLE 7

To a steel tire cord not plated with copper used in a steel tire was fixed the rubber material as in Example 4. A plurality of said test pieces were subjected to the pulling out adhesion test as specified in ASTM Specification D 2229. The average of 12 pieces was 95 kg. per one cord. With respect to similar steel tire cord but plated with brass of 70 parts copper and 30 parts zinc, the similar test was carried out to show 90 kg. per one cord. The steel cord structure was of (1 x 3+5 x 7) +1, 1.20 mm. cord diameter, 0.15 mm. wire diameter.

What is claimed is:

1. An adhesive composition comprising (A) a resorcin-formaldehyde polycondensation product prepared by reacting the two in the ratio of 1 mole resorcin to 0.3 to 0.6 mole formaldehyde and containing less than 15 weight percent of unreacted resorcin, (B) a resorcin-formaldehyde polycondensation product prepared by reacting the two in the ratio of 1 mole resorcin to 0.80-7.5 mole formaldehyde, and (C) a rubber latex, in such a ratio that said component (A) comprises 25–75 percent, and said component (B) comprises 1–20 weight percent respectively based on the total solids content the balance of which comprises the solids content of component (C).

2. A process for preparing component (A) of the adhesive composition as claimed in Claim 1, comprising the steps of reacting resorcin and formaldehyde in the mole ratio of 1 to 0.3 to 0.6, dissolving the resulting polycondensation product in a monoketone represented by the formula

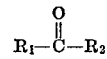

in which $R_1$ represents an aliphatic hydrocarbon radical having 1 to 4 carbon atoms and $R_2$ represents an aliphatic or aromatic hydrocarbon radical having 2 to 6 carbon atoms, and repeatedly extracting unreacted resorcin with water so as to adjustingly decrease the unreacted resorcin content down to less than 15 weight percent.

3. A process as claimed in claim 2, in which said monoketone is at least one ketone selected from the group consisting of methy isobutyl ketone, methyl-n-butyl ketone, methyl isopropyl ketone, methyl-n-propyl ketone, methyl-n-amyl ketone, methyl isoamyl ketone, and diisobutyl ketone.

4. An adhesive composition as claimed in claim 1, in which the unreacted resorcin content of component (A) is less than 10 weight percent.

5. An adhesive composition as claimed in claim 1, in which the rubber latex is a latex of at least one rubber selected from the group consisting of styrene-vinyl-pyridine-butadiene copolymer rubber, styrene-butadiene copolymer rubber, natural rubber, acrylonitrile-butadiene copolymer rubber, chloroprene-acrylic acid copolymer rubber and polychloroprene rubber.

6. An adhesive composition as claimed in claim 1 in which the unreacted resorcin content of component (A) is less than 5 weight percent.

References Cited

UNITED STATES PATENTS

| | | | |
|---|---|---|---|
| 3,547,729 | 12/1970 | Kibler | 260—846 X |
| 3,144,428 | 8/1964 | Kost | 260—32.8 A X |
| 2,940,954 | 6/1960 | Barr et al. | 260—59 |

OTHER REFERENCES

Kirk-Othmer, *Encyclopedia of Chemical Technology,* TP 9 E68 C.3, 1966 (vol. 8), p. 719.

Kirk-Othmer, *Encyclopedia of Chemical Technology,* (2 ed, *15,* 183) TP 9 E68 C.3, 1963.

ALLAN LIEBERMAN, Primary Examiner

T. DeBENEDICTIS, Sr., Assistant Examiner

U.S. Cl. X.R.

260—29.7 NR, 32.8 A, 54, 845, 846